United States Patent [19]

Rolfe et al.

[11] Patent Number: 4,808,654

[45] Date of Patent: Feb. 28, 1989

[54] FILLERS

[75] Inventors: Nicholas Rolfe, Frodsham; Richard D. A. Woode, Northwich; Roger N. Rothon, Guilden Sutton, all of England

[73] Assignee: Imperial Chemical Industries PLC, London, England

[21] Appl. No.: 880,731

[22] Filed: Jul. 1, 1986

[30] Foreign Application Priority Data

Jul. 4, 1985 [GB] United Kingdom ............... 8516989
Sep. 30, 1985 [GB] United Kingdom ............... 8524057

[51] Int. Cl.$^4$ ............................ C08K 3/10; C08K 3/26
[52] U.S. Cl. .................................... 524/424; 106/463; 524/563; 524/584; 524/606
[58] Field of Search ............... 524/424, 584, 563, 606; 106/307, 308 B, 288 B

[56] References Cited

U.S. PATENT DOCUMENTS

| | | | |
|---|---|---|---|
| 3,993,607 | 11/1976 | Florence | 524/424 |
| 4,032,509 | 6/1977 | Lee | 524/424 |
| 4,048,263 | 9/1977 | Lee | 524/424 |
| 4,064,095 | 12/1977 | Oberster et al. | 524/424 |
| 4,110,300 | 8/1978 | Matsushita | 524/424 |
| 4,272,427 | 6/1981 | Davis et al. | 524/424 |

OTHER PUBLICATIONS

Derwent Abs C86-125447 (86-289323/44), Daninichi Nippon (J61213247), Sep. 1986.
Derwent Abs 79-49748B/27, Matsushita Elec J54064518 (5-79).
Derwent Abs 79-46123B/25, Nippon Hard J54057000 (5-1979).

*Primary Examiner*—Herbert J. Lilling
*Attorney, Agent, or Firm*—Cushman, Darby & Cushman

[57] ABSTRACT

The use of a material of empirical composition $MgO(CO_2)_b(H_2O)_c$, where b is any value in the range 0.5 to 1.1 and c is any value in the range 0 to 2, and which have an amorphous content of at least 75% by weight, as a filler and/or a fire retardant for a solid or fluid matrix, a solid or fluid matrix (in particular a plastics matrix) containing such a material as dispersed particles, the materials in defined particulate morphologies, some of the materials per se and a process for their preparation.

8 Claims, No Drawings

FILLERS

The present invention relates to a novel use of materials as fillers, novel forms of the materials, some of the materials, a method for preparing them, and compostions containing them.

Non-flammable fillers for materials such as plastics should optimally:
have relative low density,
be stable to the processing conditions of the matrices in which they are used,
be non-toxic and not give rise to toxic products on combustion (thermally non-toxogenic),
have good reinforcing properties, or at least not impair the strength properties of the matrix, and, preferably, be fire-retardant.

Many conventional fire-retardants contain halogens or antimony and are thus toxic or thermally toxogenic. Replacements which are non-toxic or non-toxogenic suffer from other disadvantages, for instance a low decomposition temperature leading to instability in matrix processing, e.g. hydrated alumina or magnesium carbonate trihydrate, or high density and/or poor fire retardancy, e.g. anhydrous magnesium carbonate.

Surprisingly we have now found a class of materials which may be used as fillers and/or fire retardants, are stable to processing and are non-toxic/non-toxogenic, and have relatively low densities.

Some specific materials of this class are disclosed in Trans. Faraday Soc. 55, 2203 (1959), SU 215,905 and Zh. Prik. Khimii 45, (10) 2324 (1972). However the use of these materials as fillers or fire-retardants has not been suggested, nor has the production of specific gross morphologies of the materials for advantageous use as fillers.

Accordingly, the present invention provides the use of a material of empirical composition $MgO(CO_2)_b(H_2O)_c$, where b is any value in the range 0.5 to 1.1 and c is any value in the range 0 to 2, and which have an amorphous content of at least 75% by weight, as a filler and/or a fire-retardant for a solid or fluid matrix.

The present invention also provides the use of such a material as a fire retardant in a solid or fluid matrix.

It further provides a solid or fluid matrix (in particular a plastics matrix) containing such a material as dispersed particles, The empirical composition above of the materials used in the present invention comprises both infinitely variable mixtures of defined compounds and substantially pure defined single compounds, that is, containing less than 10% by weight, preferably less than 5% by weight, of other compounds.

The variable b is continuously variable and may lie in the ranges 0.5 to 0.9 or 0.9 to 1.1. Within the range of 0.5 to 0.9 the ranges 0.5 to 0.76 and 0.76 to 0.9 are of interest, and within the range of 0.9 to 1.1 the ranges 0.9 to 0.97 and 0.97 to 1.1 are of interest, in particular as regards variants in the preparative process of the materials.

The variable c is continuously variable and may suitably lie in the range of 0.1 to 1.6, favourably 0.15 to 1.2, and in particular 0.20 to 1.0. Within the range of 0.1 to 1.6, c may lie in the ranges of 0.1 to 0.4, 0.4 to 0.75 and 0.75 to 1.6, in particular as regards variants in the preparative process of the materials.

The following ranges of material compositions (specified by the parameters b and c) are of interest, as are combinations of adjacent such ranges:

| Range No | b | c |
|---|---|---|
| 1 | 0.50 to 0.76 | 0.1 to 0.4 |
| 2 | 0.76 to 0.90 | 0.1 to 0.4 |
| 3 | 0.90 to 0.97 | 0.1 to 0.4 |
| 4 | 0.97 to 1.10 | 0.1 to 0.4 |
| 5 | 0.50 to 0.76 | 0.4 to 0.75 |
| 6 | 0.76 to 0.90 | 0.4 to 0.75 |
| 7 | 0.90 to 1.10 | 0.4 to 0.75 |
| 8 | 0.50 to 0.76 | 0.75 to 1.6 |
| 9 | 0.76 to 0.90 | 0.75 to 1.6 |
| 10 | 0.90 to 1.10 | 0.75 to 1.6 |

Specific materials in these ranges are as in the Table below.

The amorphous content specified hereinbefore for the materials used in the present invention relates to the total amorphous content of the material regardless of which component(s) are in amorphous form. The residual non-amorphous content of the present composition is crystalline. This residual content may be in the range of 15 to 20% by weight, but is favourably not more than 5% by weight. The crystalline content of the material and hence the amorphous content may be readily ascertained by conventional and routine X-ray methods.

The favoured (at least 95% amorphous) materials may be readily identified by their lack of, or negligible, refractive anisotropy.

TABLE

| b | c | b | c |
|---|---|---|---|
| Range 2 | | Range 7 | |
| 0.86 | 0.22 | 0.93 | 0.57 |
| 0.86 | 0.26 | 0.93 | 0.67 |
| 0.86 | 0.29 | 0.95 | 0.42* |
| 0.86 | 0.30 | 0.95 | 0.44 |
| 0.86 | 0.35 | 0.95 | 0.45 |
| **0.86 | 0.37 | 0.95 | 0.49 |
| Range 3 | | 0.95 | 0.57 |
| **0.90 | 0.24 | 0.95 | 0.67 |
| 0.90 | 0.26 | 0.96 | 0.42 |
| 0.90 | 0.37 | 0.96 | 0.44 |
| 0.93 | 0.22 | 0.96 | 0.45 |
| 0.93 | 0.26 | 0.96 | 0.49 |
| 0.93 | 0.29 | 0.96 | 0.57 |
| 0.93 | 0.30 | 0.96 | 0.67* |
| 0.93 | 0.35 | 0.97 | 0.42 |
| 0.93 | 0.37 | 0.97 | 0.44* |
| 0.95 | 0.22 | 0.97 | 0.45 |
| **0.95 | 0.26 | 0.97 | 0.49 |
| 0.95 | 0.29 | 0.97 | 0.57 |
| 0.95 | 0.30 | 0.97 | 0.67 |
| 0.95 | 0.35 | 0.98 | 0.42 |
| 0.95 | 0.37 | 0.98 | 0.44 |
| 0.96 | 0.22 | 0.98 | 0.45* |
| 0.96 | 0.26 | 0.98 | 0.49 |
| 0.96 | 0.29** | 0.98 | 0.57* |
| 0.96 | 0.30 | 0.98 | 0.67 |
| 0.96 | 0.35 | 1.00 | 0.42 |
| 0.96 | 0.37 | 1.00 | 0.44 |
| Range 4 | | 1.00 | 0.45 |
| 0.97 | 0.22* | 1.00 | 0.49 |
| 0.97 | 0.26* | 1.00 | 0.57 |
| 0.97 | 0.27* | 1.00 | 0.67 |
| 0.97 | 0.29 | 1.01 | 0.42 |
| 0.97 | 0.30* | 1.01 | 0.44 |
| 0.97 | 0.35* | 1.01 | 0.45 |
| 0.97 | 0.37 | *1.01 | 0.49 |
| 0.98 | 0.22* | 1.01 | 0.57 |
| 0.98 | 0.23* | 1.01 | 0.67 |
| 0.98 | 0.26 | 1.02 | 0.42 |
| 0.98 | 0.29 | 1.02 | 0.44 |
| 0.98 | 0.30 | 1.02 | 0.45 |

TABLE-continued

| b | c | b | c |
|---|---|---|---|
| 0.98 | 0.35 | 1.02 | 0.49 |
| 0.98 | 0.37 | 1.02 | 0.57 |
| 1.00 | 0.22 | 1.02 | 0.67 |
| 1.00 | 0.26* | Range 8 | |
| 1.00 | 0.29 | 0.60 | 1.29 |
| 1.00 | 0.30 | ****0.63 | 0.89 |
| 1.00 | 0.35* | 0.70 | 1.29 |
| 1.00 | 0.37 | 0.73 | 1.29 |
| 1.01 | 0.22 | Range 10 | |
| 1.01 | 0.26 | 0.93 | 0.76 |
| 1.01 | 0.29 | 0.93 | 1.29 |
| 1.01 | 0.30 | 0.93 | 1.52 |
| 1.01 | 0.35 | 0.95 | 0.76 |
| 1.01 | 0.37 | 0.95 | 1.29 |
| 1.02 | 0.22 | 0.95 | 1.52 |
| 1.02 | 0.26 | 0.96 | 0.76 |
| 1.02 | 0.29 | 0.96 | 1.29 |
| 1.02 | 0.30 | 0.96 | 1.52 |
| *1.02 | 0.35 | 0.97 | 0.76*** |
| 1.02 | 0.37 | 0.97 | 1.29 |
| Range 5 | | 0.97 | 1.52*** |
| ****0.60 | 0.70 | 0.98 | 0.76 |
| **0.61 | 0.60 | 0.98 | 1.29* |
| ****0.63 | 0.70 | 0.98 | 1.52 |
| *****0.70 | 0.50 | 1.00 | 0.76 |
| *****0.70 | 0.51 | 1.00 | 1.29 |
| 0.73 | 0.49 | 1.00 | 1.52 |
| *****0.73 | 0.50 | 1.01 | 0.76 |
| *****0.73 | 0.51 | 1.01 | 1.29 |
| Range 7 | | 1.01 | 1.52 |
| 0.93 | 0.42* | 1.02 | 0.76 |
| 0.93 | 0.44 | 1.02 | 1.29 |
| 0.93 | 0.45 | 1.02 | 1.52 |
| 0.93 | 0.49 | | |

The filler of the invention generally has a true particle relative density in the range of 1.3 to 2.5 favourably 1.4 to 2.4 and more favourably 1.5 to 2.3. More favoured materials may have such a density in the range 2.0 to 2.3, but the range 1.5 to 2.0 is preferred.

For its use as a filler in the present invention the material is provided in particulate form. The particles may have any gross morphology and size compatible with adequate ease of handling, lack of impairment of the strength properties of the matrix and non-toxicity.

The particles may for example be acicular, tabular, lamellar, polyhedral such as cubic, spherical, elliptical or in twinned or slightly agglomerated versions of these forms. For general ease of conventional handling of these materials it is preferred that the particles are not lamellar since these tend to agglomerate to a degree which hinders their adequate dispersion in the matrix. A favoured morphology is acicular.

The particles may be as small as is compatible with the criteria listed above. Thus the specific surface area is generally less than 40 $m^2/g$ favourably less than 20 $m^2/g$, preferably less than 10 $m^2/g$, and the smallest cross-dimension may be greater than 1 micron, preferably greater than 3 micron, although a specific surface area up to 400 $m^2/g$ and smaller dimensions down to 0.05 micron may be desirable for some applications of the fillers for example in surface coatings and sealants. The surface area may be favourably reduced by controlling the morphology of the particles as described hereinafter.

A group of materials used as fillers in the present invention is one comprising materials of empirical composition $MgO(CO_2)_b(H_2O)_c$, where b is any value in the range of 0.76 to 1.1 and where c is any value in the range 0 to 2, having an amorphous content of at least 75% by weight, and a true particle relative density in the range 1.5 to 2.3.

A second group of such materials is one as recited for the first group above, but wherein b is any value in the range 0.5 to 0.76.

A third group of materials used as fillers in the present invention is one comprising a material of empirical composition $MgO(CO_2)_b(H_2O)_c$ where b is any value in the range 0.76 to 1.1 and where c is any value in the range 0 to 2, having an amorphous content of at least 75% by weight and a specific surface area of less than 20 $m^2/g$.

A fourth groups of such materials is one as recited for the third group above, but wherein b is any value in the range 0.5 to 0.76 and where the specific area is less than 40 $m^2/g$.

The materials used as fillers in the invention will in general have a (minimum) decomposition temperature greater than 200° C. or will consist of components each having a decomposition temperature greater than 200° C. The materials may have a (minimum) decomposition temperature in the range of 230 to 300° C., but favourably one greater than 300° C. Where the material is to be used as a fire retardant it should also have a (minimum) decomposition temperature below 500° C.

Some of the fillers used in the present invention are novel, and accordingly in other aspects the present invention provides the following materials of empirical composition $MgO(CO_2)_b(H_2O)_c$ wherein b and c are any value within the following respective ranges:

| b | c |
|---|---|
| 0.5 to 0.76 | 0.1 to 0.4 |
| 0.76 to 0.9 | 0.4 to 0.75 |
| 0.76 to 1.1 | 0.75 to 1.6 |
| 0.76 to 0.9 | 0.75 to 1.6 |

We have found that, although the fillers used in the present invention are substantially amorphous materials, it is possible to produce particles of them with desired specific gross morphologies, and that it is desirable to do so to confer controllable physical properties (e.g. reinforcement properties) on the fillers and on matrices containing them. Such fillers are novel.

Accordingly, in a further aspect the present the invention also provides a particulate material of empirical composition $MgO(CO_2)_b(H_2O)_c$, where b is any value in the range 0.5 to 1.1 and c is any value in the range 0 to 2, having an amorphous content of at least 75% by weight, and a defined particulate morphology.

When used herein "defined particulate morphology" means that the particles of the material are amorphous, but have a gross morphology which recognisably belongs to one of the standard morphological categories, albeit possibly in a twinned, agglomerated, fractured or abraded form. Examples of suitable morphologies are recited hereinbefore.

Matrix materials for which the present fillers are particularly suitable are those of relatively high processing temperatures and include those requiring processing at at least 160° C. Such materials include polymers and copolymers of alkenes, such as polypropylene, of vinylics, such as ethylene vinyl acetate (EVA), and of acrylics, and polyesters, polyamides such as nylon 6:6, and high-crystalline materials such as those having a high aromatic content, such as more than 75% w/w aromatic content.

We have found that filler materials with a low water content, e.g. those in ranges 1 to 4 as defined are especially suitable both for water sensitive or water-curing matrices (such as polyurethanes and some silicones) and for high processing temperature polymers (such as polyamides and high-aromatic polymers). Low to moderate water content materials, e.g. those in ranges 1 to 7 as defined are especially suitable for electrically insulative polymers such as EVA).

High water content materials, e.g. those in ranges 8 to 10 as defined may be used for thermoset polymers.

The present invention also provides a process for the preparation of the materials of the invention, characterised by the controlled dehydration of a dry essentially pure material of empirical composition $MgO(CO_2)_e[(NH_4)_2CO_3]_f(H_2O)_g$ where e is any value in t range 0.7 to 1.1, f is any value in the range 0 to 1 and g is any value not less than that of c in the desired end product, and where at least some of the water content is thermally labile.

"Essentially pure" as used herein means that the materials contain less than 10% by weight, preferably less than 5% by weight of other materials not of the above empirical composition. Such impurities include in particular those often naturally associated with magnesium carbonates, such as calcite.

The above empirical composition comprises both infinitely variable mixtures of defined compounds and substantially pure defined single compounds, that is containing less than 10% by weight, preferably less than 5% by weight, of other compounds.

Each material is conventionally dry, that is, it is not admixed with any water not held in the material structure.

In one process variant, e is in the range 0.9 to 1.1, for example 1, f is 0 and g is any value not less than 2, for example 3. This variant is especially suitable for the dehydration of hydrated neutral magnesium carbonates.

In a second process variant, e is in the range 0.9 to 1.1, f is 1, and g is any value not less than 2, for example 4. This variant is especially suitable for the dehydration of hydrated neutral magnesium ammonium carbonates (with concomitant loss of $NH_3$ and $CO_2$).

In a third process variant, e is in the range 0.7 to 0.9, for example 0.75 or 0.8, f is 0, and g is any value not less than b in the desired final product but in any case not less than 0.5. This variant is especially suitable for the dehydration of hydrated basic magnesium carbonates.

In general, in all the process variants the dehydration must be controlled to the extent that significant hydrolysis of the carbonate anion (i.e. to give a value of b below 0.5) by the water content does not occur. This is achieved by effecting dehydration at temperatures elevated in a controlled manner, such as by heating externally, for example using a furnace, or internally, for example using microwaves, and may be effected under an inert atmosphere, for example nitrogen or a partial pressure of steam, which may be still or continually removed, or in vacuo.

Where a specific morphology of the product is not important, or a spherical or elliptical morphology is acceptable, the dehydration may be expedited using a bed of starting material fluidised by an inert carrier gas. Where a specific morphology with minimal fracture or abrasion is desired, such agitation should be avoided, but the bulk surface area may be maximised for example by spreading on trays.

The first process variant is especially suitable for the production of materials of the empirical composition $MgO(CO_2)_b(H_2O)_c$ where b is in the range of 0.76 t 1.1, i.e. materials in ranges 2 to 4, 6, 7, 9 and 10 as hereinbefore defined.

Dehydration in the process generally tends to reduce the value of b (i.e. the $CO_2$ content) by hydrolysis and the value of b in the product of this variant may be controlled by controlling the process temperature (and optionally the pressure) and hence the rates of dehydration and hydrolysis. In general in the first process variant the temperature should not exceed 310° C. and suitably may be in the range 100 to 300° C. at atmospheric pressure.

We have found that ranges of temperature in this range of 100 to 300° C. of interest are 100 to 175° C., 175 to 225° C. and 225 to 300° C. are of interest in tending to produce materials within the different composition ranges above, although we do not exclude gradual or stepwise changes in process temperature.

Using process temperatures in the range 100 to 175° C. and typically process times of 5 to 25 hr tends to give a product with a relatively high water content (i.e. higher e value) and a relatively high carbonate content (i.e. higher b value). For example, starting from $M_gCO.3H_2O$ (such as nesquehonite), these conditions tend to give products within range 10 as defined with b near 1 (0.90 to 1.1) and c in excess of 0.75 (0.75 to 1.6).

The materials marked *** in the foregoing Table were prepared in this manner at 160, 110 and 160° C. respectively.

Using process temperatures in the range 175 to 225° C., typically 200° C., and typically process times of 3 to 30 hrs tends to give a product with a fairly low water content (i.e. fairly low c value) but with a relatively high carbonate content (i.e. higher b values) and thus tends to effect further dehydration with minimal carbonate loss. For example, again starting from $M_gCO_3.3H_2O$ these tend to give products within ranges 4 and 7 as defined with b still near 1 (0.90 to 1.1) but c in the range 0.1 to 0.75. Longer process times tend to lower the c value without materially affecting the b value.

The materials marked * in the foregoing table were prepared in this manner at 200° C.

Using process temperatures in the range 225 to 300° C., typially 250° C., and typically process times of 3 to 10 hrs tends to give a product with a relatively low water content (i.e. lower c value) and a moderately low carbonate content (i.e. fairly low b value), and thus tends to effect dehydration with some carbonate loss. For example, again starting from $M_gCO_3.3H_2O$, these conditions tend to give products within ranges 2 and 3 as defined with c in the lowest range of 0.1 to 0.4 and b in the range of 0.9 to 0.97 and even as 0.76 to 0.9.

The materials marked ** in the foregoing Table were prepared in this manner at 250° C.

If it is desired to produce materials with a fairly low carbonate content but with a relatively high water content (i.e. fairly low b, higher c values) these may be produced by the controlled rehydration of the products immediately above by e.g. exposure to water vapour at a temperature in the range of 0 to 100° C. It is believed that to succeed this process must be carried out on the filler itself (i.e. not in the matrix). For example such controlled rehydration may be used to convert range 2 or 3 products into range 6 or 9 products, (i.e. with c values in the ranges 0.4 to 0.75 and 0.75 to 1.6 respectively).

The second process variant is especially suitable for the production of materials with a relatively low carbonate content, i.e. clearly consisting of or comprising basic magnesium carbonates where b is in the range 0.5 to 0.76 and the materials are in ranges 1,5 and 8 as defined.

The starting materials in this variant may suitably be hydrated neutral or basic magnesium ammonium carbonates, generally the former. In the former case (for example where the starting material is $MgCO_3.(NH_4)_2CO_3.4H_2O$) such materials tend to dehydrate and undergo substantial carbonate hydrolysis at relatively low temperatures (for example 50 to 250° C.).

Dehydration of the neutral mixed carbonate at 100 to 250° C. tends to form products in range 5, i.e. with a fairly low water content (c in the range 0.4 to 0.75).

Dehydration below 100° C. (optionally at reduced pressure) tends to form products in range 8 (i.e. c in the range 0.75 to 1.6) as does controlled rehydration (as described hereinbefore for the first process variant) of the above range 5 products.

It is believed that dehydration under reduced pressure at similar temperatures will tend to form products in range 1 (i.e. c in the range 0.1 to 0.4).

The third process variant is again especially suitable for the production of materials consisting of or comprising basic magnesium carbonates as described for the second process variant.

Suitable starting materials include basic magnesium carbonates such as hydromagnesite $MgO.(CO_2)_{0.8}.H_2O$, and $MgO.(CO_2)_{0.75}.H_2O$, either material or synthetic. At temperatures in the range 170 to 400° C. these materials tend to dehydrate with some carbonate hydrolysis.

Dehydration at 300 to 360° C. tends to form products in range 5, i.e. with a fairly low water content (c in the range 0.4 to 0.75).

Dehydration at lower temperatures (e.g. 170 to 300° C.) tends to form range 1 products (i.e. c in the range 0.75 to 1.6) as does controlled rehydration (as described for the second process variant) of the above range 5 products.

Dehydration at higher temperatures (e.g. 360 to 400° C. tends to form products in range of (i.e. a in the range 0.1 to 0.4).

Advantageously, the starting material above may be a defined single compound, that is containing less than 10% by weight, preferably less than 5% by weight of other compounds.

Advantageously, the starting material for the process may be essentially crystalline, that is more than 90%, preferably more than 95% crystalline.

A substantially pure, essentially crystalline single compound is particularly advantageous since it is possible to retain the crystal morphology of the starting material during the dehydration process. Since the morphology of the starting material may be controlled conventionally, it is possible to control the morphology of the material of the invention to optimise its physical properties, as mentioned hereinbefore.

The starting material may suitably be magnesium carbonate trihydrate $MgCO_3.3H_2O$, as this is readily precipitated from aqueous solution and its morphology in precipitation can be controlled. Its acicular form is favoured in particular with an aspect ratio of at least 5:1.

Where the morphology is not critical, for example where fire retardancy rather than reinforcement is of interest, a product milled before or after preparative dehydration may be acceptable, in particular with an aspect ratio of at most 2:1.

Other morphologies of the hydrates may be produced most readily by the conventional addition to the motor liquor of known crystal growth poisons which are specific to different faces of the growing crystals, or less conveniently hydrothermally, that is by applying differing degrees of temperature and pressure to the crystals in equilibrium with the mother liquor.

The starting materials of the process of the present invention are either known, or are preparable analogously to, or are routinely derivable from, known materials. For example known acicular magnesium carbonate trihydrate $MgCO_3.3H_2O$ may be prepared conventionally as a precipitate by the decarbonation of an aqueous solution of magnesium bicarbonate at below 50° C., by passing air through the solution, or by the carbonation of a magnesium hydroxide suspension.

Similarly $M_gCO_3.(NH_4)_2CO_3.4H_2O$ may be prepared by the reaction of aqueous ammonium carbonate and magnesium nitrate.

The materials used in the present invention may be used as such or in conjunction, juxtaposition or admixture with additives (for example conventional fillers and/or fire retardants) as a filler and/or fire-retardant.

Materials produced by the second process variant described hereinbefore tend to be of interest more as fillers than as fire retardants. Other materials used in this invention are useful as fillers.

The invention also provides a fluid body or a solid body or particle comprising a matrix in which a material of the present invention is dispersed. The matrix may be a polymeric material constituting at least part of a moulding, extrusion, composite or granulate, or a surface coating or sealant.

The materials used in the invention may be coated with filler coatings conventional in the art.

The preparation and use of the materials of the present invention is illustrated by the following Examples and the preparation of starting materials therefor by the following Description.

DESCRIPTION

A slurry containing 75 g/l magnesium hydroxide was fed continuously into a stirred crystalliser at the rate of 0.170 l/minute. The crystalliser was also fed continuously with gaseous carbon dioxide at a rate of 13.45 l/minute; distilled water was also added to the gas stream at a rate of 0.012 l/minute. The crystalliser was stirred and the contents were controlled to maintain a working volume of 12 litres.

The reaction was allowed to proceed adiabatically, so that with a magnesium hydroxide slurry feed temperature of 20°–25° C. a reaction temperature of 42°–47° C. was achieved. Reaction pH was maintained at pH 7.2.

The suspension removed from the reactor was sparged with nitrogen until the pH increased to pH 7.9°–8.0. The crystals were separated by filtration, washed with distilled water and allowed to dry under ambient conditions. The product was identified by X-ray diffraction as nesquehonite ($MgCO_3.3H_2O$) and contained 29.225 MgO and 32.54% $CO_2$. The overall yield on magnesium was 93.5%. Microscopic examination of the product showed it to be predominantly singular acicular crystals.

EXAMPLE 1

The nesquehonite crystals of the Description (1.85 kg) were slowly calcined in an oven/or air for 7 hours. The gas temperature in the oven was maintained at 200° C.

The calcined material was identified by X-ray diffraction techniques as primarily non-crystalline material. The product contained 43.14% MgO and 46.03% $CO_2$, the remainder being water of constitution. The particles were still primarily acicular and more than 0.1 mm in length. The BET surface area by nitrogen absorption was 11 $m^2/g$. Absolute particle density particle was 1.9 g/ml. The refractive index in the parallel direction was 1.426–1.430 and in the perpendicular direction 1.426–1.440, indicating its essentially non-crystalline nature.

When heated at a rate of 20° C. per minute weight losses of the calcined product were:
- 0–200° C.—0.6%
- 200–367° C.—9.0%
- 367–516° C.—35.7%
- 516–590° C.—9.9%
- 590–789° C.—2.7%

The materials listed in the Table hereinbefore are prepared analogously.

By way of example, the materials marked * in the Table were also prepared at 200° C.

The materials marked ** in the Table were prepared at 250° C.

The materials marked *** in the Table were prepared at temperature below 200° C.

EXAMPLE 2

Synthetic basic magnesium carbonate (Mallinkrodt AR) of composition in the range $MgO(CO_2)_{0.75-0.8}.H_2O$ was heated at 330° C. in air for 3 hours. After cooling in air the residual solid is found to have compositions in the range $MgO(CO_2)_{0.7-0.73}(H_2O)_{(0.5-0.51)}$.

EXAMPLE 3

Magnesium ammonium carbonate of composition $MgCO_3.(NH_4)_2CO_3.4H_2O$ was heated in air at 100° C. The residual solid was found to have the composition $MgO(CO_2)_{0.6}(H_2O)_{0.7}$.

EXAMPLE 4

Composites A and B were prepared by compounding the following ingredients on a heated twin roll mill.

| | |
|---|---|
| Filler 125 g | |
| EVA Copolymer 98.5 g | (ICI, EVATANE 28-05) |
| Rhenogran P50 3 g | (BAYER, HYDROLYSIS STABILISER) |
| Perkadox 14/40 6 g | (AKZO-CHEMIE Bis(tertiary butyl-peroxy)iso-propyl benzene) |

In composite A the filler was powdered crystalline $MgCO_3$ (magnesite) while in composite B it was the essentially amorphous product from Example 1, milled prior to compounding.

The milled composites were press cured for 10 minutes at 180° C. into sheets 2 mm thick. Samples were cut from sheets and their flammability determined by the standard limiting oxygen index method. The ash from the polymer when burnt at its limiting oxygen index was also collected and analysed by X-ray diffraction. The results are given below:

| | COMPOSITE A (Magnesite) | COMPOSITE B (Product of this invention) |
|---|---|---|
| Limiting Oxygen Index (LOI) % | 24 | 33 |
| Analysis of Ash From Combustion | $MgCO_3$ | MgO |

These results show that under the combustion conditions the product of this invention decomposes and significantly reduces the polymer flammability while conventional crystalline magnesium carbonate does not.

The materials marked * in the Table hereinbefore are incorporated in the above manner into analogues of Composite B. The materials similarly confer fire-resistance on the composites.

EXAMPLE 5

Composites of polypropylene homopolymer (ICI, HW525N) (100 g) with the following fillers were prepared using a twin screw extruder:

| | |
|---|---|
| (a) acicular filler (b 0.95, c 0.26) | 16 g |
| (b) acicular filler (b 0.95, c 0.26) | 24 g |
| (c) acicular filler (b 0.97, c 0.27) | 24 g. |

The fillers were all prepared as in Example 1 at 200° C.

Composite 5(c) was injection moulded into a test piece, which was then tested by the standard limiting oxygen index method, and found to have a limiting oxygen index of 25%.

The materials marked * in the Table hereinbefore are incorporated in the above manner into analogous composites. The materials similarly confer fire-resistance on the composites.

EXAMPLE 6

Composites of nylon 6:6 (100 g) with the following fillers were prepared using a twin screw extruder in the case of a) and b), and using a single screw extruder in the case of c):

| | |
|---|---|
| (a) acicular filler (b 0.90, c 0.24) | 16 g |
| (b) acicular filler (b 0.90, c 0.24) | 24 g |
| (c) acicular filler (b 0.90, c 0.24) | 50 g. |

The filler was prepared as in Example 1 at 250° C.

Composite 6(c) was injection moulded into a test piece, which was then tested by the standard limiting oxygen index method, and found to have a limiting oxygen index of 31%.

Materials marked ** in the Table hereinbefore are particularly suitable for high processing temperature plastics such as polyamides and high aromatic content polymers. These materials are incorporated in the above manner into analogous composites and similarly confer fire-resistance on the composites.

We claim:

1. A solid or fluid matrix containing, as a filler, a material of empirical composition $MgO(CO_2)_b(H_2O)_c$, where b is any value in the range 0.5 to 1.1 and c is any value in the range 0 to 2, and which has an amorphous content of at least 75% by weight.

2. A solid or fluid matrix according to claim 1 where the material has a defined particulate morphology.

3. A solid or fluid matrix according to claim 1 in which said material is a fire retardant.

4. A solid or fluid matrix according to Claim 1 or 2, where b is any value in the range 0.75 to 0.9 and c is any value in the range 0.4 to 7.5, or b is any value in the range 0.76 to 0.9 and c is any value in the range 0.75 to 1.6.

5. A solid or fluid matrix according to claim 1 or 2, where b and c are any values in the ranges:

| b | c | b | c |
|---|---|---|---|
| 0.90 to 1.10 | 0.1 to 0.04 | 0.50 to 0.76 | 0.75 to 1.6 |

-continued

| b | c | b | c |
|---|---|---|---|
| 0.50 to 1.10 | 0.4 to 0.7 | | |

6. A solid or fluid matrix according to claim 1 or 2, where the matrix is a polyamide or high aromatic content polymer, the material is a filler or fire retardant, b is any value in the range 0.76 to 0.96 and c is any value in the range 0.1 to 0.4.

7. A solid or fluid matrix according to claim 1 or 2, where the matrix is a vinylic polymer or copolymer, the material is a filler or fire retardant, b is any value in the range 0.97 to 1.1 and c is any value in the range 0.1 to 0.75.

8. A plastics matrix containing a material as defined in claim 1 as dispersal particles.

* * * * *